(12) United States Patent
Chauvet et al.

(10) Patent No.: US 8,423,505 B2
(45) Date of Patent: Apr. 16, 2013

(54) CATALOG REORGANIZATION APPARATUS AND METHOD

(75) Inventors: Philip R. Chauvet, Tucson, AZ (US);
David Charles Reed, Tucson, AZ (US);
Michael Robert Scott, Ocean View, HI (US); Max Douglas Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 325 days.

(21) Appl. No.: 12/684,941

(22) Filed: Jan. 9, 2010

(65) Prior Publication Data

US 2011/0173154 A1 Jul. 14, 2011

(51) Int. Cl.
*G06F 17/30* (2006.01)

(52) U.S. Cl.
USPC ............ 707/610; 707/612; 707/704; 711/114

(58) Field of Classification Search .................. 707/610, 707/613, 615, 612, 704; 711/114
See application file for complete search history.

(56) References Cited

U.S. PATENT DOCUMENTS

| | | | |
|---|---|---|---|
| 5,355,477 A | 10/1994 | Strickland et al. | |
| 5,761,667 A | 6/1998 | Koeppen | |
| 5,848,241 A * | 12/1998 | Misinai et al. | ................. 709/213 |
| 7,117,229 B2 | 10/2006 | Marshall et al. | |
| 7,376,675 B2 * | 5/2008 | Pruet, III | ....................... 707/615 |
| 2007/0088769 A1 | 4/2007 | Pace et al. | |
| 2008/0109599 A1 | 5/2008 | Smith | |
| 2008/0243945 A1 | 10/2008 | Hanus et al. | |

OTHER PUBLICATIONS

Craig Mullins; "DB2 Update Reorganizing the DB2 Catalog & Directory"; published by Data Warehousing Guidelines for DB2; dated Jul. 2000; pp. 1-7.*

* cited by examiner

*Primary Examiner* — Monica Pyo
(74) *Attorney, Agent, or Firm* — Nelson and Nelson; Daniel P. Nelson; Alexis V. Nelson (57) ABSTRACT

A method for reorganizing a catalog to improve I/O performance includes initially placing a shared lock on a source catalog. The method then makes a point-in-time copy of the source catalog to generate a target catalog. Once the target catalog is generated, the method reorganizes the contents of the target catalog. Optionally, while reorganizing the contents of the target catalog, the method temporarily releases the shared lock on the source catalog and mirrors I/O intended for the source catalog to a buffer. The buffered I/O may then be used to update the target catalog to bring it current with the source catalog. When the target catalog is reorganized and up-to-date, the method upgrades the shared lock on the source catalog to an exclusive lock, overwrites the source catalog with the target catalog, and releases the exclusive lock. A corresponding apparatus and computer program product are also disclosed and claimed herein.

12 Claims, 8 Drawing Sheets

CATALOG REORGANIZATION APPARATUS AND METHOD

FIELD OF THE INVENTION

This invention relates to apparatus and methods for improving I/O performance, and more particularly to apparatus and methods for reorganizing a catalog in order to improve I/O performance.

BACKGROUND OF THE INVENTION

Virtual storage access method (VSAM) catalogs are used to keep track of the condition and location of VSAM datasets in mainframe computing environments. The catalogs are VSAM key-sequenced data sets (KSDS) and are important because VSAM data sets cannot exist until they are first defined in a catalog. Similarly, VSAM data sets cannot be accessed unless information about the VSAM data sets can first be obtained from the catalog. Among other information, the catalogs store information about the amount of space allocated to different VSAM data sets, the addresses of VSAM data sets, the attributes of VSAM data sets, and statistical information about VSAM data sets.

Because catalogs are themselves VSAM data sets, they are prone to splitting of control areas (CAs) and control intervals (CIs) over time which can lead to I/O performance degradation. This splitting can cause the data in the catalog to become disjointed. This problem is well documented and there are various products that have been developed to alleviate this problem. Each of these products, however, typically requires some period of quiesced activity to the catalog while it is reorganized. This generally inhibits both reads and writes to the catalog during the quiesced period. This means that a client may need to cease work that requires access to the catalog during the quiesced period. This is undesirable in today's around-the-clock processing climate.

In view of the foregoing, what are needed are apparatus and methods to reorganize a catalog in order to improve I/O performance. Specifically, apparatus and methods are needed to remove CA and CI splits and order data sequentially so that the catalog can be accessed in a more efficient manner. Ideally, such apparatus and methods would enable the reorganization to take place in a fast and efficient manner while minimally disrupting I/O to the catalog or VSAM data sets referenced by the catalog.

SUMMARY

The invention has been developed in response to the present state of the art and, in particular, in response to the problems and needs in the art that have not yet been fully solved by currently available apparatus and methods. Accordingly, the invention has been developed to provide apparatus and methods for reorganizing catalogs to improve I/O performance. The features and advantages of the invention will become more fully apparent from the following description and appended claims, or may be learned by practice of the invention as set forth hereinafter.

Consistent with the foregoing, a method for reorganizing a catalog to improve I/O performance is disclosed herein. In certain embodiments, such a method includes initially placing a shared lock on a source catalog. The method then makes a point-in-time copy of the source catalog to generate a target catalog. Once the target catalog is generated, the method reorganizes the contents of the target catalog. Optionally, while reorganizing the contents of the target catalog, the method temporarily releases the shared lock on the source catalog and mirrors I/O intended for the source catalog to a buffer. The buffered I/O may then be used to update the target catalog to bring it current with the source catalog. When the target catalog is reorganized and up-to-date, the method upgrades the shared lock on the source catalog to an exclusive lock. The method then overwrites the source catalog with the target catalog and releases the exclusive lock. In this way, the method efficiently reorganizes the source catalog while minimally disrupting I/O to the source catalog or VSAM data sets referenced by the source catalog.

A corresponding apparatus and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

As will be appreciated by one skilled in the art, the present invention may be embodied as an apparatus, system, method, or computer program product. Furthermore, the present invention may take the form of a hardware embodiment, a software embodiment (including firmware, resident software, micro-code, etc.) configured to operate hardware, or an embodiment combining software and hardware aspects that may all generally be referred to herein as a "module" or "system." Furthermore, the present invention may take the form of a computer-usable storage medium embodied in any tangible medium of expression having computer-usable program code stored therein.

Any combination of one or more computer-usable or computer-readable storage medium(s) may be utilized to store the computer program product. The computer-usable or computer-readable storage medium may be, for example but not limited to, an electronic, magnetic, optical, electromagnetic, infrared, or semiconductor system, apparatus, or device. More specific examples (a non-exhaustive list) of the computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device. In the context of this document, a computer-usable or computer-readable storage medium may be any medium that can contain, store, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like, and conventional procedural programming languages, such as the "C" programming language or similar programming languages. Computer program code for implementing the invention may also be written in a low-level programming language such as assembly language.

The present invention may be described below with reference to flowchart illustrations and/or block diagrams of methods, apparatus, systems, and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
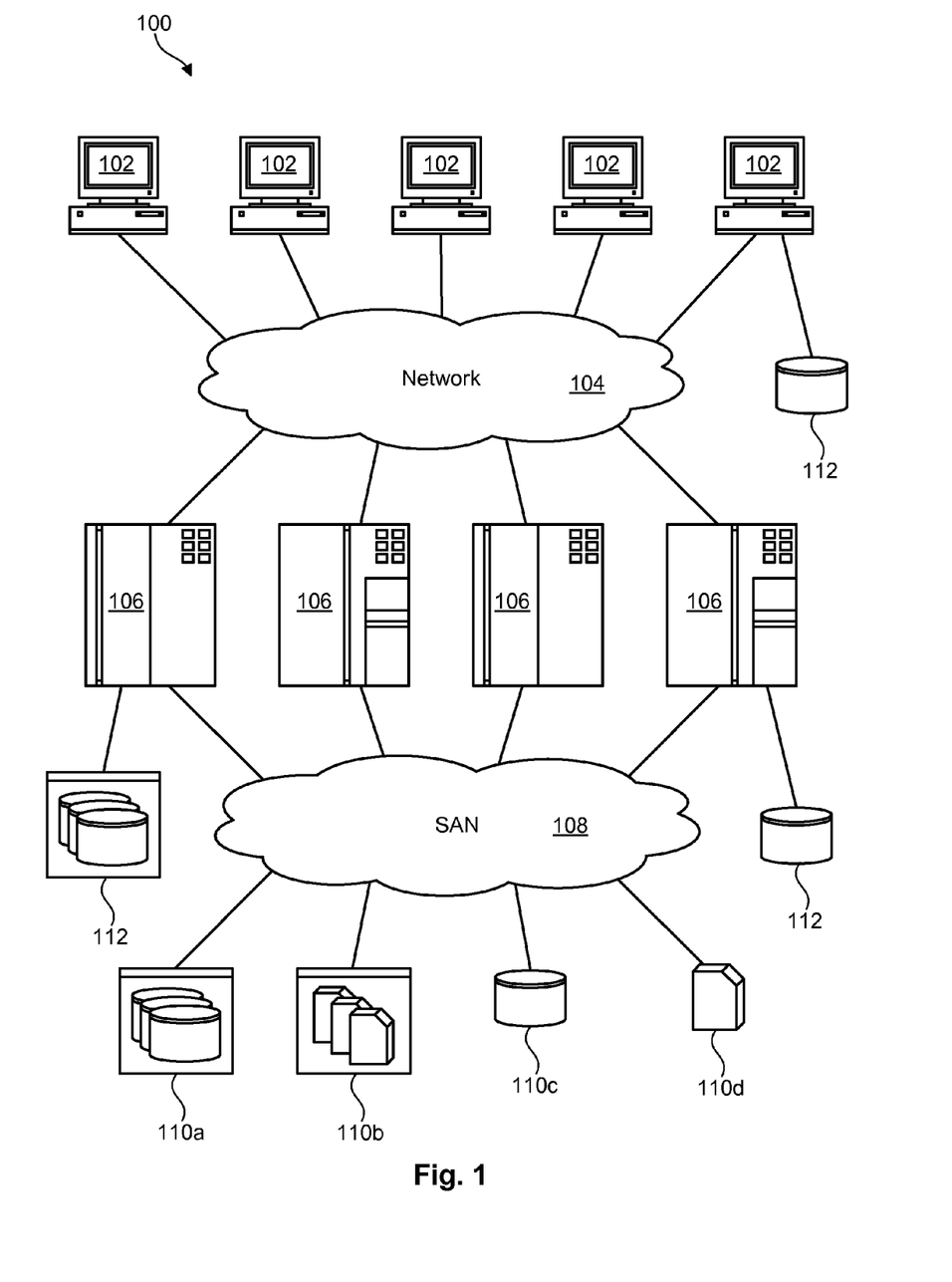
FIG. 1 is a high-level block diagram showing one example of a network architecture in which an apparatus and method in accordance with the invention may be implemented.

Referring to FIG. 1, one example of a network architecture 100 is illustrated. The network architecture 100 is presented to show one example of an environment where an apparatus and method in accordance with the invention may be implemented. The network architecture 100 is presented only by way of example and is not intended to be limiting. Indeed, the apparatus and methods disclosed herein may be applicable to a wide variety of different computers, servers, storage devices, and network architectures, in addition to the network architecture 100 shown.

As shown, the network architecture 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "host systems" 106). In general, client computers 102 may initiate communication sessions, whereas server computers 106 may wait for requests from the client computers 102. In certain embodiments, the computers 102 and/or servers 106 may connect to one or more internal or external direct-attached storage systems 112 (e.g., arrays of hard-disk drives, solid-state drives, tape drives, etc.). These computers 102, 106 and direct-attached storage systems 112 may communicate using protocols such as ATA, SATA, SCSI, SAS, Fibre Channel, or the like. One or more of the computers 102, 106 may utilize the apparatus and methods described herein to reorganize VSAM catalogs or other data in the storage systems 112.

The network architecture 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems 110, such as arrays 110a of hard-disk drives or solid-state drives, tape libraries 110b, individual hard-disk drives 110c or solid-state drives 110c, tape drives 110d, CD-ROM libraries, or the like. Where the network 108 is a SAN, the servers 106 and storage systems 110 may communicate using a networking standard such as Fibre Channel (FC). One or more of the servers 106 may utilize the apparatus and methods described herein to reorganize VSAM catalogs or other data in the storage systems 110.

Figure 2:
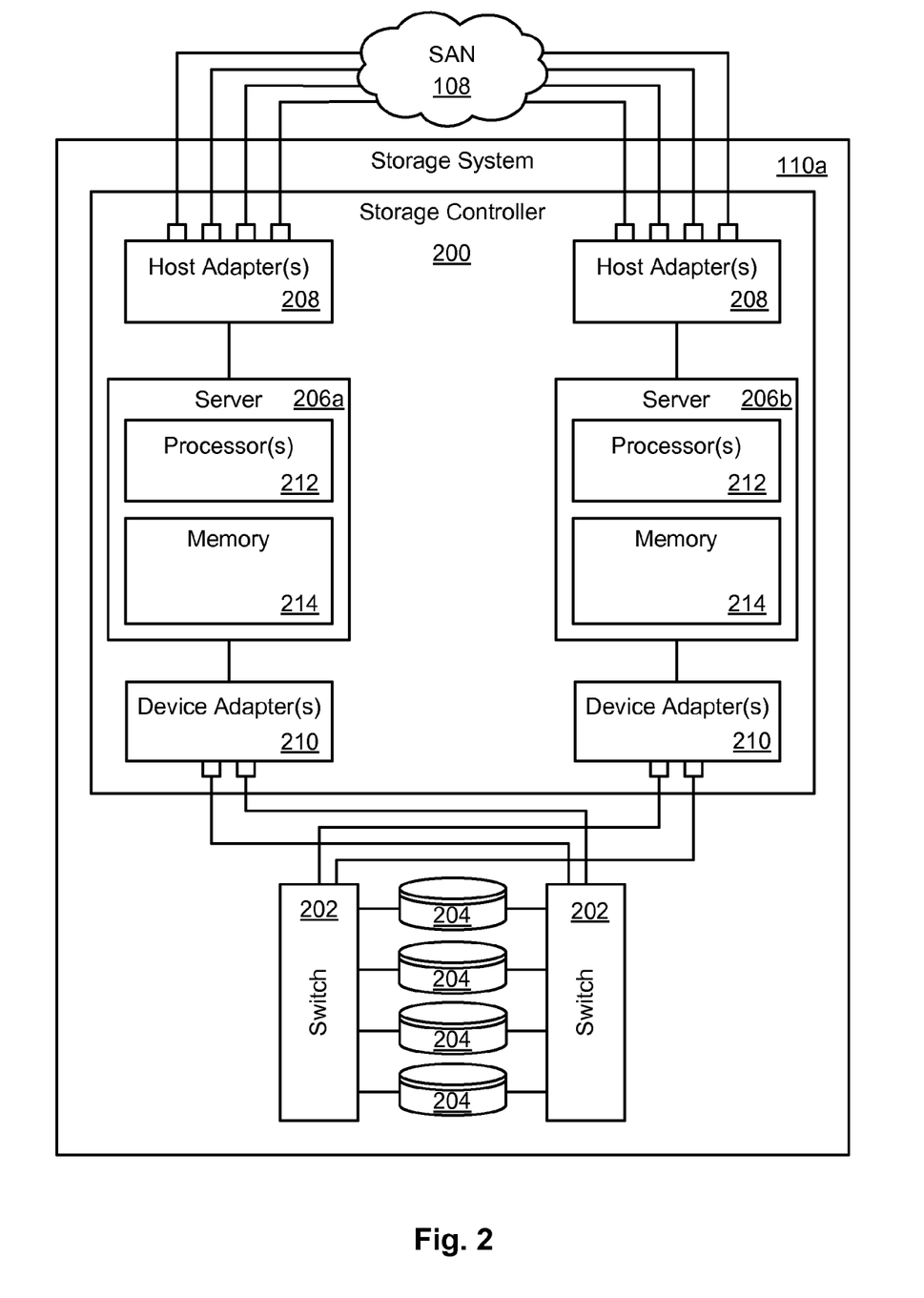
FIG. 2 is a high-level block diagram showing one example of a storage system in which a catalog and VSAM data sets may be stored.

Referring to FIG. 2, one embodiment of a storage system 110a containing an array of storage devices 204 (e.g., hard-disk drives 204 and/or solid-state drives 204) is illustrated. The internal components of the storage system 110a are shown since, in certain embodiments, a VSAM catalog and data sets may be stored in such a storage system 110a although they are not limited to such a storage system 110a. As shown, the storage system 110a includes a storage controller 200, one or more switches 202, and one or more storage devices 204, such as hard-disk drives 204 or solid-state drives 204 (e.g., flash-memory-based drives 204). The storage controller 200 may enable one or more hosts 106 (e.g., open system and/or mainframe servers 106) to access data stored in the one or more storage devices 204.

As shown in FIG. 2, the storage controller 200 includes one or more servers 206. The storage controller 200 may also include host adapters 208 and device adapters 210 to connect the storage controller 200 to host devices 106 and storage devices 204, respectively. Multiple servers 206a, 206b may provide redundancy to ensure that data is always available to connected hosts 106. Thus, when one server 206a fails, the other server 206b may remain functional to ensure that I/O is able to continue between the hosts 106 and the storage devices 204. This process may be referred to as a "failover."

One example of a storage system 110a having an architecture similar to that illustrated in FIG. 2 is the IBM DS8000™ enterprise storage system. The DS8000™ is a high-performance, high-capacity storage controller providing disk storage that is designed to support continuous operations. The DS8000™ series models may use IBM's POWER5™ servers 206a, 206b, which may be integrated with IBM's virtualization engine technology. Nevertheless, the apparatus and methods disclosed herein are not limited to the IBM DS8000™ enterprise storage system 110a, but may be implemented in any comparable or analogous storage system 110, regardless of the manufacturer, product name, or components or component names associated with the storage system 110. Any storage system 110 that could benefit from one or more embodiments of the invention is deemed to fall within the scope of the invention. Thus, the IBM DS8000™ is presented only by way of example and is not intended to be limiting.

In selected embodiments, each server 206 includes one or more processors 212 (e.g., n-way symmetric multiprocessors) and memory 214. The memory 214 may include volatile memory (e.g., RAM) as well as non-volatile memory (e.g., ROM, EPROM, EEPROM, hard disks, flash memory, etc.). The volatile memory and non-volatile memory may store software modules that run on the processor(s) 212 and are used to access data in the storage devices 204. The servers 206 may host at least one instance of these software modules. These software modules may manage all read and write requests to logical volumes in the storage devices 204.

Figure 3:
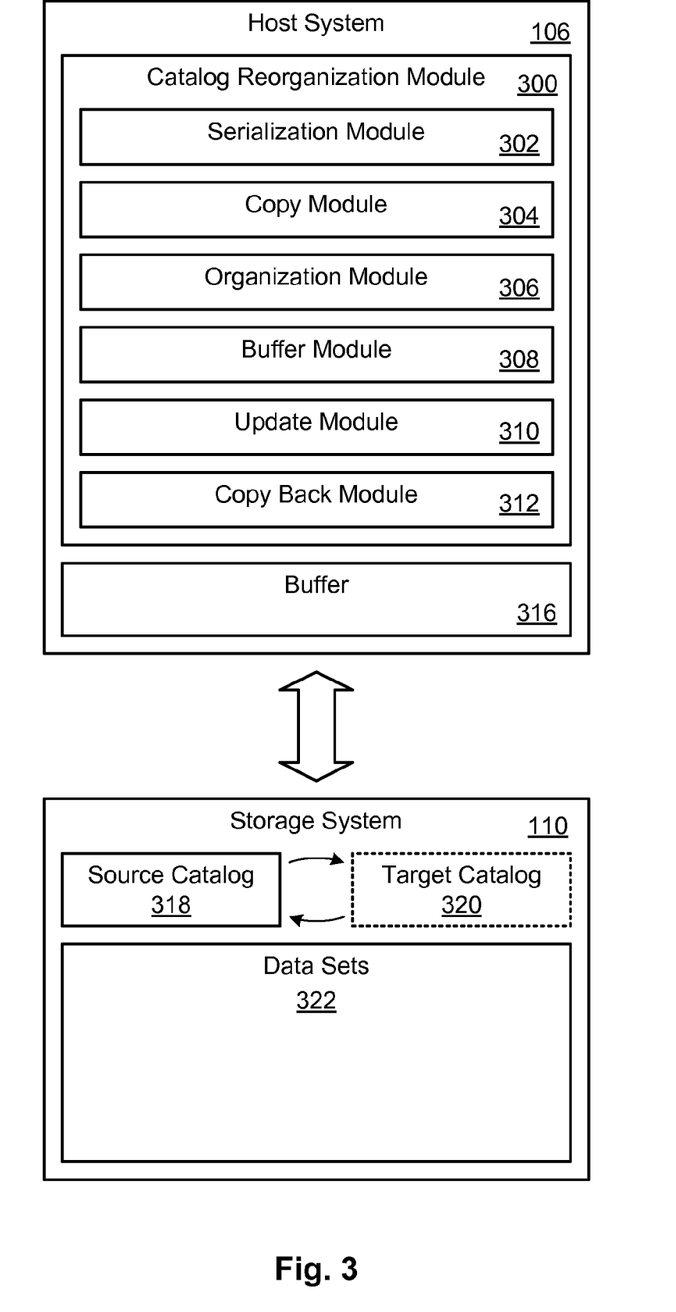
FIG. 3 is a high-level block diagram showing various modules, residing on a host system, that may be used to efficiently reorganize a catalog while minimally disrupting I/O to the catalog.

Referring to FIG. 3, apparatus and methods in accordance with the invention may be implemented by one or more modules. These modules may be implemented in hardware, software or firmware executable on hardware, or a combination thereof. These modules are presented only by way of example and are not intended to be limiting. Indeed, alternative embodiments may include more or fewer modules than those illustrated. Furthermore, it should be recognized that, in some embodiments, the functionality of some modules may be broken into multiple modules or, conversely, the functionality of several modules may be combined into a single module or fewer modules. It should also be recognized that the modules are not necessarily implemented in the locations where they are illustrated. For example, some functionality shown in the host system 106 may actually be implemented in the storage system 110 and vice versa. Other functionality shown only in the host system 106 may actually be distributed across the host system 106 and the storage system 110. Thus, the location of the modules is presented only by way of example and is not intended to be limiting.

As shown in FIG. 3, in selected embodiments, a host system 106 may include a catalog reorganization module 300 to reorganize a VSAM catalog 318 (referred to herein as a "source catalog 318) in a storage system 110. The catalog 318 may keep track of the condition and location of VSAM datasets 322 in the storage system 110. As previously mentioned, reorganizing the catalog 318 may improve I/O performance between the host system 106 and the storage system 110. More specifically, the catalog reorganization module 300 may remove CA and CI splits and ensure that data in the catalog 318 is organized sequentially. The catalog reorganization module 300 may perform these tasks while minimally disrupting I/O to the catalog 318 and the data sets 322.

To provide the above-stated functionality, in selected embodiments, the catalog reorganization module 300 includes one or more of a serialization module 302, a copy module 304, an organization module 306, a buffer module 308, an update module 310, and a copy back module 312. The host system 106 may also include a buffer 316, the function of which will be described in more detail hereafter.

In general, the serialization module 302 may be used to place and release locks (e.g., shared and/or exclusive locks) on the source catalog 318 to control read and write access thereto. A shared lock may inhibit write access but allow read access to the source catalog 318. An exclusive lock may inhibit both read and write access to the source catalog 318. In a z/OS mainframe environment, a shared lock may be implemented with a SHARED ENQUEUE and an exclusive lock may be implemented with an EXCLUSIVE ENQUEUE. These shared and exclusive locks may be used to maintain the source catalog's data integrity while other modules, applications, and processes manipulate the data contained therein.

In order to reorganize the source catalog 318 and thereby improve I/O performance, the serialization module 302 may initially place a shared lock on the source catalog 318 to inhibit writes to the catalog 318 but allow other application or processes to read from the source catalog 318. While this shared lock is in place, a copy module 304 may make a point-in-time copy of the source catalog 318 to generate a target catalog 320. For example, in the z/OS environment, the copy module 304 may call System Data Mover (SDM) software to do a track level flashcopy of the source catalog 318, thereby generating a substantially instantaneous point-in-time copy 320 of the source catalog 318. The target catalog 320 is a temporary copy that may be deleted at a later point in time, as will be explained in more detail hereafter.

Once the target copy 320 is generated, the serialization module 302 may release the shared lock on the source catalog 318. This will allow I/O, including both reads and writes, to resume on the source catalog 318. The amount of time required to place the shared lock, make the point-in-time copy, and release the shared lock may be on the order of milliseconds and thus may minimally disrupt I/O to the source catalog 318.

Once the target copy 320 has been generated and the serialization module 302 has released the shared lock on the source catalog 318, an organization module 306 may reorganize the data in the target catalog 320, such as by removing CA and CI splits and placing the data in sequential order. This may be accomplished by reading the target catalog's records into the host's memory, reorganizing the records, and then writing the target catalog's records back to the storage system 110. While this reorganization is occurring, a buffer module 308 may mirror any writes made to the source catalog 318 to a buffer 316. Once the reorganization is complete, the serialization module 302 may reinstate the shared lock on the source catalog 318 to inhibit writes thereto. This will leave the source catalog 318 in a read-only state so that other applications can locate and access data sets 322 while the shared lock is in place. At this point, an update module 310 may update the reorganized target catalog 320 by retrieving the writes from the buffer 316 and performing these writes on the target catalog 320. This will bring the target catalog 320 current with the source catalog 318.

At this point, the serialization module 302 may momentarily upgrade the shared lock on the source catalog 318 to an exclusive lock, thereby inhibiting both reads and writes to the source catalog 318. A copy back module 312 may then overwrite the source catalog 318 with the reorganized target catalog 320, thereby making the source catalog 318 the same as the reorganized target catalog 320. While the exclusive lock on the source catalog 318 is still in place, the serialization module 302 may place a lock on other related data, such as the VSAM volume data set (VVDS) of the source catalog 318. This will allow the update module 310 to update essential fields in the VVDS's catalog entry such as the VSAM volume record (VVR) timestamp, the Hi-Used-RBA (HURBA), and the Hi-Allocated-RBA (HARBA). Once these essential fields are updated, the serialization module 302 may release the locks on the source catalog 318 and the other related data. This will allow I/O to resume to the reorganized source catalog 318 and the data sets 322. The target catalog 320 may be deleted at this point, if desired. Using this methodology, the source catalog 318 may be reorganized in a fast efficient manner while minimally disrupting I/O thereto.

Figure 4:
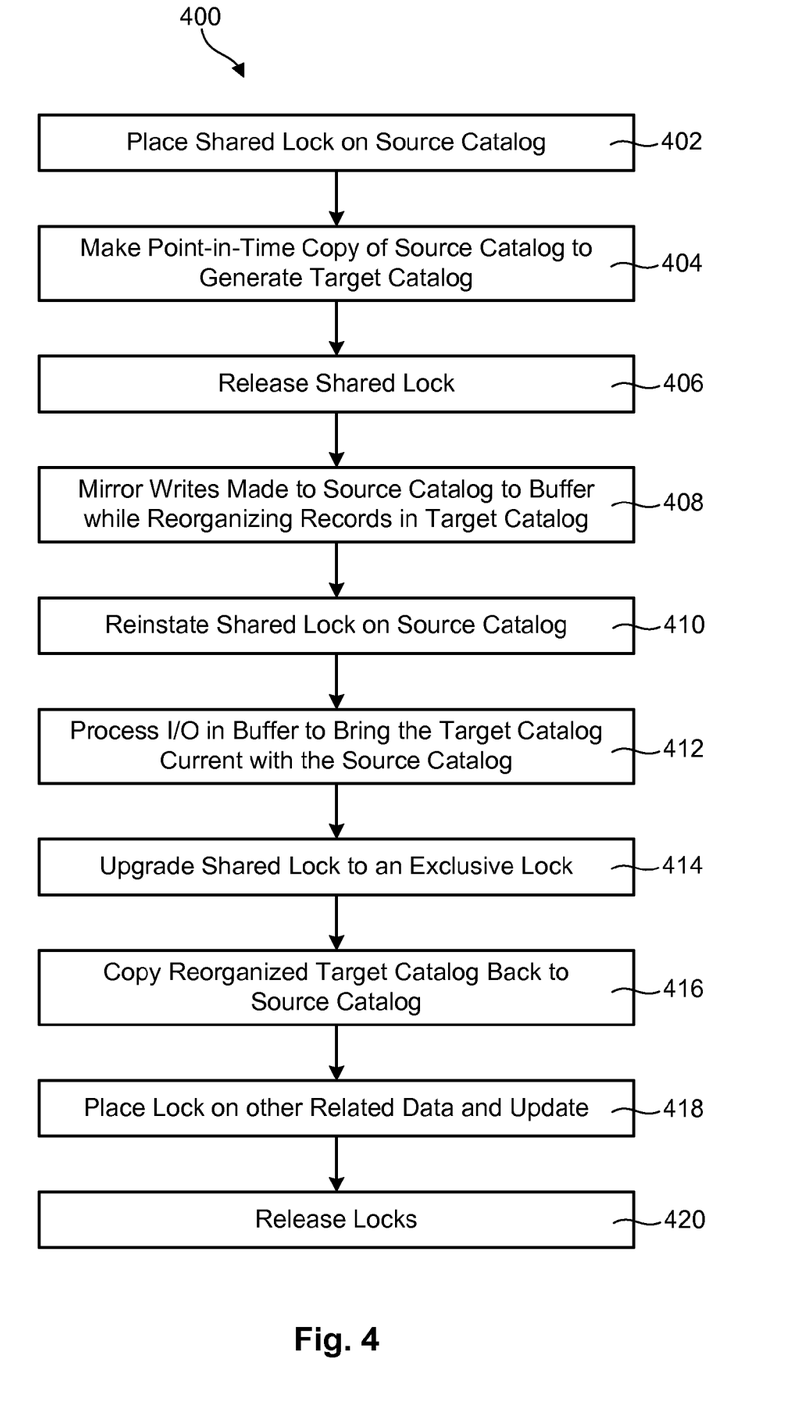
FIG. 4 is a flow diagram showing one embodiment of a method for reorganizing a catalog while minimally disrupting I/O to the catalog.

Referring to FIG. 4, one embodiment of a method 400 for reorganizing a catalog 318 while minimally disrupting I/O thereto is illustrated. The method 400 roughly corresponds to the functionality described in association with FIG. 3. As shown, the method 400 initially places 402 a shared lock on a source catalog 318. The method 400 then makes 404 a point-in-time copy of the source catalog 318 to generate a target catalog 320. Once the target copy 320 is generated, the method 400 releases 406 the shared lock on the source catalog 318, thereby allowing both reads and writes to resume to the source catalog 318.

Once the target copy 320 has been generated 404 and the shared lock has been released 406, the method 400 mirrors 408 any writes that are made to the source catalog 318 to a buffer 316. Meanwhile, the method 400 reorganizes 408 the data in the target catalog 320 such as by removing CA and CI splits and sequentially ordering the data. Once the data has been reorganized, the method reinstates 410 the shared lock on the source catalog 318 to inhibit writes thereto. The method 400 then processes 412 the I/O in the buffer 316 to bring the target catalog 320 up-to-date with the source catalog 318

At this point, the method 400 upgrades 414 the shared lock on the source catalog 318 to an exclusive lock, thereby inhibiting both reads and writes to the source catalog 318. The method 400 then copies 416 the reorganized target catalog 320 back to the source catalog 318, thereby overwriting the source catalog 318 with reorganized data. The method 400 may then place 418 a lock on other related data, such as the VSAM volume data set (VVDS) of the catalog 318. This will allow the method 400 to update 418 essential fields in the VVDS's catalog entry such the VSAM volume record (VVR) timestamp, the Hi-Used-RBA (HURBA), and the Hi-Allocated-RBA (HARBA). Once these essential fields are updated 418, the method 400 releases 420 the locks on the source catalog 318 and the other related data, thereby allowing I/O to resume on the source catalog 318 and the underlying data sets 322.

Figure 5:
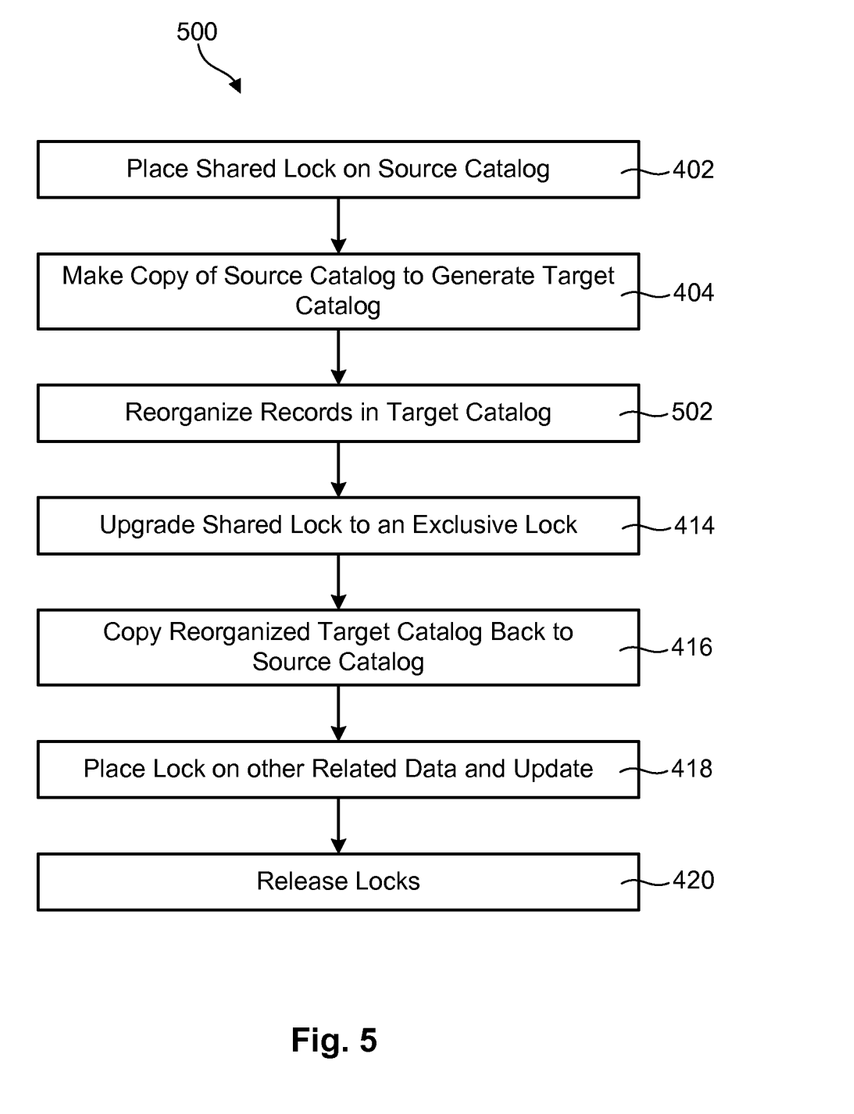
FIG. 5 is a flow diagram showing another embodiment of a method for reorganizing a catalog while minimally disrupting I/O to the catalog.

Referring to FIG. 5, an alternative embodiment of the method 400 of FIG. 4 is illustrated. In general, the alternative method 500 maintains the shared lock on the source catalog 318 while reorganizing 502 the target catalog 320 (as opposed to temporarily suspending the shared lock). This eliminates the need for the buffer 316 as well as to update the target catalog 320 with writes to the source catalog 318 (since writes to the source catalog 318 will not be occurring during the shared lock). Each of the other steps 402, 404, 414, 416, 418, 420 are substantially the same as those illustrated in FIG. 4.

Figure 6:
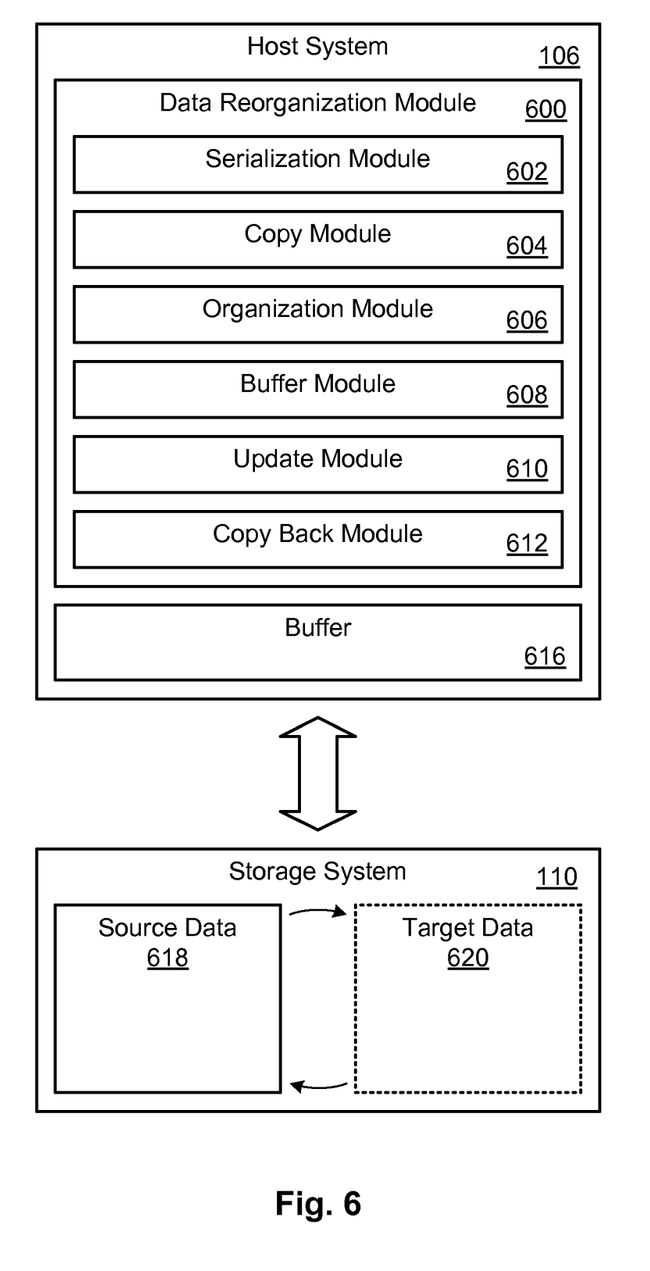
FIG. 6 is a high-level block diagram showing various modules, residing on a host system, that may be used to reorganize data while minimally disrupting I/O to the data.

Referring to FIG. 6, although the apparatus and methods discussed herein have been discussed primarily in association with reorganizing records in a catalog 318, the apparatus and methods discussed herein have much broader applicability. Indeed, reorganizing records in a catalog 318 represents just one type of action that may be addressed by the apparatus and methods disclosed herein. In other embodiments, the apparatus and methods may be used to reorganize other types of data 618 while minimally disrupting I/O to the data 618. The operation of the modules discussed below is the same or similar to the operation of the modules discussed in association with FIG. 3, except that the functionality has been broadened to include other types of data.

To reorganize source data 618, a serialization module 602 may initially place a shared lock on the source data 618 to inhibit writes to the source data 618 but allow other applications or processes to read from the source data 618. While the shared lock is in place, a copy module 604 may make a point-in-time copy of the source data 618 to generate target data 620. Once the target data 620 is generated, the serialization module 602 may release the shared lock on the source data 618 to allow reads and writes to resume on the source data 618.

Once the target data 620 has been generated and the serialization module 602 has released the shared lock on the source data 618, an organization module 606 may reorganize the data in the target data 620 in any desired manner. While this reorganization is occurring, a buffer module 608 may mirror writes to the source data 618 to a buffer 616. Once the reorganization is complete, the serialization module 602 may reinstate the shared lock on the source data 618 to inhibit writes thereto. An update module 610 may then update the reorganized target data 620 by retrieving the writes from the buffer 616 and performing the writes on the target data 620. This will bring the target data 620 current with the source data 618.

At this point, the serialization module 602 may upgrade the shared lock on the source data 618 to an exclusive lock, thereby inhibiting both reads and writes to the source data 618. A copy back module 612 may then overwrite the source data 618 with the target data 620, thereby making the source data 618 the same as the reorganized target data 620. While the exclusive lock on the source data 618 is still in place, the serialization module 602 may place a lock on other related data, such as metadata for the source data 618. This will allow the update module 610 to update the related data to correspond to the newly reorganized source data 618. The serialization module 602 may then release the locks on the source data 618 and the other related data. This will allow I/O to resume on the source data 618. The target data 620 may then be deleted.

Figure 7:
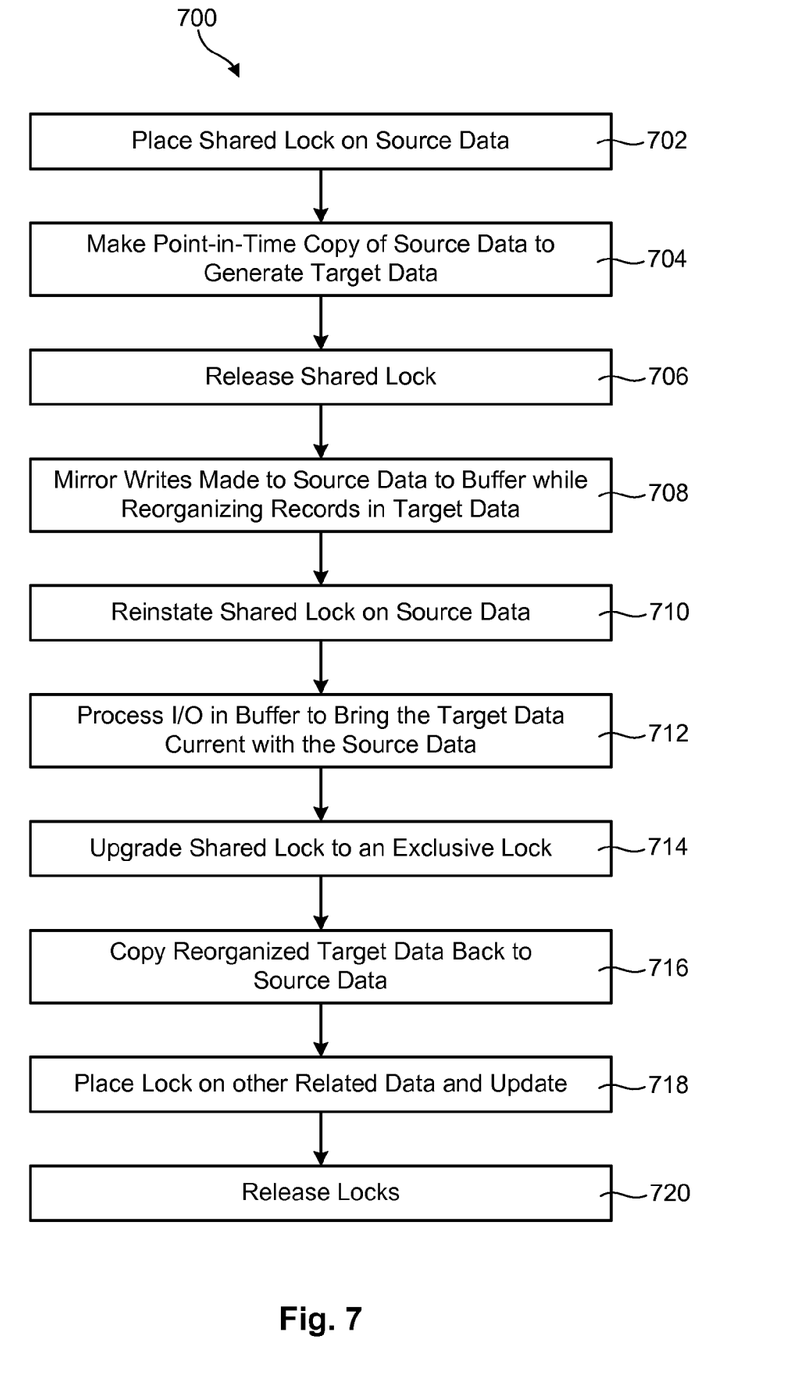
FIG. 7 is a flow diagram showing one embodiment of a method for reorganizing data while minimally disrupting I/O to the data.

Referring to FIG. 7, one embodiment of a method 700 for reorganizing data while minimally disrupting I/O to the data is illustrated. This method 700 roughly corresponds to the functionality described in association with FIG. 6. As shown, the method 700 initially places 702 a shared lock on source data 618. The method 700 then makes 704 a point-in-time copy of the source data 618 to generate target data 620. Once the target data 620 is generated, the method 700 releases 706 the shared lock on the source data 618, allowing both reads and writes to occur to the source data 618.

Once the target data 620 has been generated 704 and the shared lock has been released 706, the method 700 mirrors 708 any writes to the source data 618 to a buffer 616. Meanwhile, the method 700 reorganizes 708 the data in the target data 620 in any desired manner. Once the data has been reorganized, the method 700 reinstates 710 the shared lock on the source data 618 to inhibit writes thereto. The method 700 then processes 712 the I/O in the buffer 616 to bring the target data 620 current with the source data 618.

At this point, the method 700 upgrades 714 the shared lock on the source data 618 to an exclusive lock to inhibit both reads and writes to the source data 618. The method 700 then copies 716 the reorganized target data 620 back to the source data 618, thereby overwriting the source data 618 with the target data 620. The method 700 may then place 718 a lock on other related data, such as metadata for the source data 618. This will allow the method 700 to update 718 the related data. Once this data is updated 718, the method 700 may release 720 the locks on the source data 618 and the related data, thereby allowing I/O to resume on the source data 618.

Figure 8:
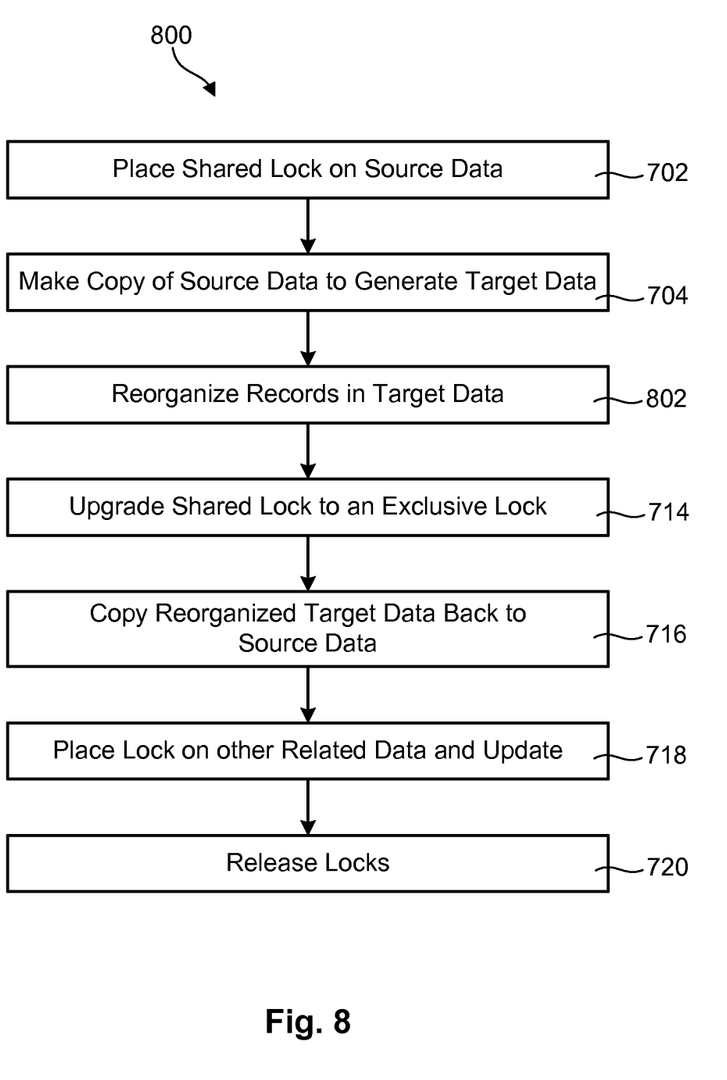
FIG. 8 is a flow diagram showing another embodiment of a method for reorganizing data while minimally disrupting I/O to the data.

Referring to FIG. 8, an alternative embodiment of the method 700 of FIG. 7 is illustrated. This method 800 maintains the shared lock on the source data 618 (as opposed to releasing the shared lock) while reorganizing 802 the target data 620. This eliminates the need for the buffer 616 as well as the need to update the target data 620 with writes to the source data 618 (since writes to the source data 618 will be inhibited). Each of the other steps 702, 704, 714, 716, 718, 720 are substantially the same as those illustrated in FIG. 7.

The flowcharts and block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method to reorganize a catalog to improve I/O performance, the method comprising:
    placing a shared lock on a source catalog;
    while the shared lock is in place, making a point-in-time copy of the source catalog to generate a target catalog;
    reorganizing the contents of the target catalog;
    releasing the shared lock on the source catalog while reorganizing the contents of the target catalog, thereby allowing writes to occur to the source catalog while the contents of the target catalog are being reorganized;
    mirroring writes occurring to the source catalog to a buffer while the shared lock is released;
    placing an exclusive lock on the source catalog once the target catalog has been reorganized;
    updating the reorganized target catalog with the writes in the buffer;
    while the exclusive lock is in place, overwriting the source catalog with the reorganized target catalog; and
    releasing the exclusive lock.

2. The method of claim 1, further comprising reinstating the shared lock on the source catalog after the contents of the target catalog have been reorganized.

3. The method of claim 1, wherein updating comprises updating the reorganized target catalog prior to overwriting the source catalog.

4. The method of claim 1, wherein updating comprises updating the reorganized target catalog after overwriting the source catalog.

5. A non-transitory computer-readable storage medium having computer-usable program code embodied therein, the computer-usable program code comprising:
    computer-usable program code to place a shared lock on a source catalog;
    computer-usable program code to, while the shared lock is in place, make a point-in-time copy of the source catalog to generate a target catalog;
    computer-usable program code to reorganize the contents of the target catalog;
    computer-usable program code to release the shared lock on the source catalog while reorganizing the contents of the target catalog, thereby allowing writes to occur to the source catalog while the contents of the target catalog are being reorganized;
    computer-usable program code to mirror writes occurring to the source catalog to a buffer while the shared lock is released;
    computer-usable program code to place an exclusive lock on the source catalog once the target catalog has been reorganized;
    computer-usable program code to update the reorganized target catalog with the writes in the buffer;
    computer-usable program code to, while the exclusive lock is in place, overwrite the source catalog with the reorganized target catalog; and
    computer-usable program code to release the exclusive lock.

6. The non-transitory computer-readable storage medium of claim 5, further comprising computer-usable program code to reinstate the shared lock on the source catalog after the contents of the target catalog have been reorganized.

7. The non-transitory computer-readable storage medium of claim 5, wherein updating comprises updating the reorganized target catalog prior to overwriting the source catalog.

8. The non-transitory computer-readable storage medium of claim 5, wherein updating comprises updating the reorganized target catalog after overwriting the source catalog.

9. An apparatus to reorganize a catalog to improve I/O performance, the apparatus comprising:
    a plurality of modules implemented in at least one of hardware and software operating on hardware, the modules comprising:
        a serialization module to place a shared lock on a source catalog for data sets residing on a storage system;
        a copy module to, while the shared lock is in place, make a point-in-time copy of the source catalog to generate a target catalog;
        an organization module to reorganize the contents of the target catalog;
        the serialization module further configured to release the shared lock on the source catalog while reorganizing the contents of the target catalog, thereby allowing writes to occur to the source catalog while the contents of the target catalog are being reorganized;
        a buffer module to mirror writes occurring to the source catalog to a buffer while the shared lock is released;
        the serialization module further configured to place an exclusive lock on the source catalog after the contents are reorganized;
        an update module to update the reorganized target catalog with the writes in the buffer;

a copy back module to, while the exclusive lock is in place, overwrite the source catalog with the reorganized target catalog; and the serialization module configured to release the exclusive lock after the source catalog is overwritten.

10. The apparatus of claim 9, wherein the serialization module is further configured reinstate the shared lock on the source catalog after the contents of the target catalog have been reorganized.

11. The apparatus of claim 9, wherein the update module updates the reorganized target catalog prior to the source catalog being overwritten.

12. The apparatus of claim 9, wherein the update module updates the reorganized target catalog after the source catalog is overwritten.

* * * * *